United States Patent [19]

Ramos

[11] 4,298,082
[45] Nov. 3, 1981

[54] ELECTRIC PROPULSION SYSTEM FOR WHEELED VEHICLES

[76] Inventor: Joseph A. Ramos, 18 Hill St., San Francisco, Calif. 94110

[21] Appl. No.: 926,837

[22] Filed: Jul. 21, 1978

[51] Int. Cl.³ ............................................. B60K 17/08
[52] U.S. Cl. .................................. 180/65 R; 318/139
[58] Field of Search ................. 180/65 R, 65 B, 65 D; 318/139; 320/61

[56] References Cited

U.S. PATENT DOCUMENTS

| | | | |
|---|---|---|---|
| 3,530,356 | 9/1970 | Aronson | 318/139 X |
| 3,689,826 | 9/1972 | Cherry | 320/61 X |
| 3,815,001 | 6/1974 | Jamieson | 318/139 |
| 3,861,485 | 1/1975 | Busch | 180/65 R |
| 3,899,041 | 8/1975 | Mager | 180/165 R |
| 4,095,665 | 6/1978 | Armfield | 318/139 X |

*Primary Examiner*—Joseph F. Peters, Jr.
*Assistant Examiner*—Michael Mar
*Attorney, Agent, or Firm*—Alvin E. Hendricson

[57] ABSTRACT

An electric propulsion system for a wheeled vehicle has a generator and motor connected to a drive shaft and an electrical system for charging a battery during all conditions of power transfer from the wheels of the vehicle to the generator to minimize energy required for propulsion. A variable speed power coupling unit connecting the motor to the drive shaft has sprockets revolving about a belt connected sun sprocket with speed control effected by varying the rate of satellite sprocket rotation.

6 Claims, 12 Drawing Figures

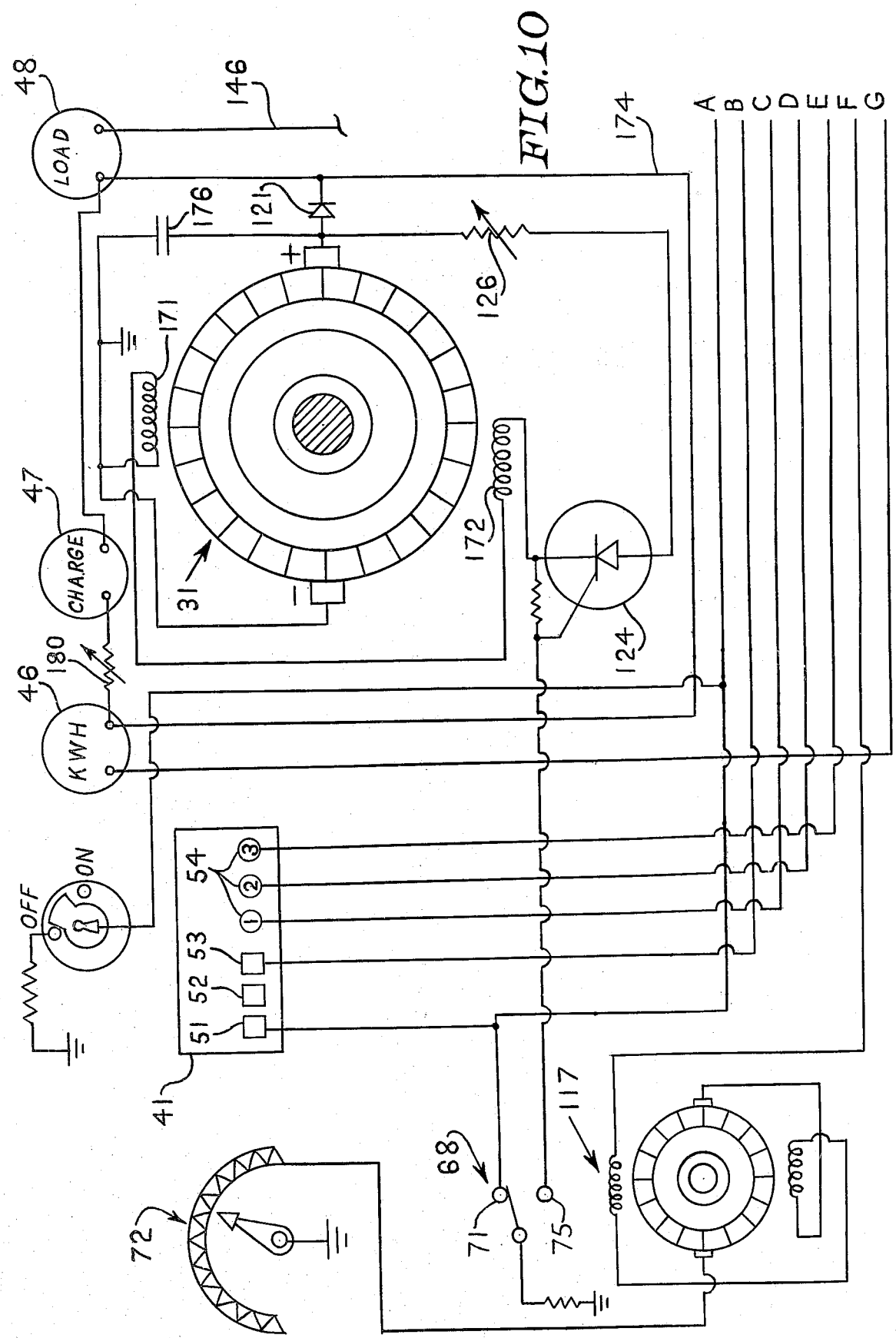

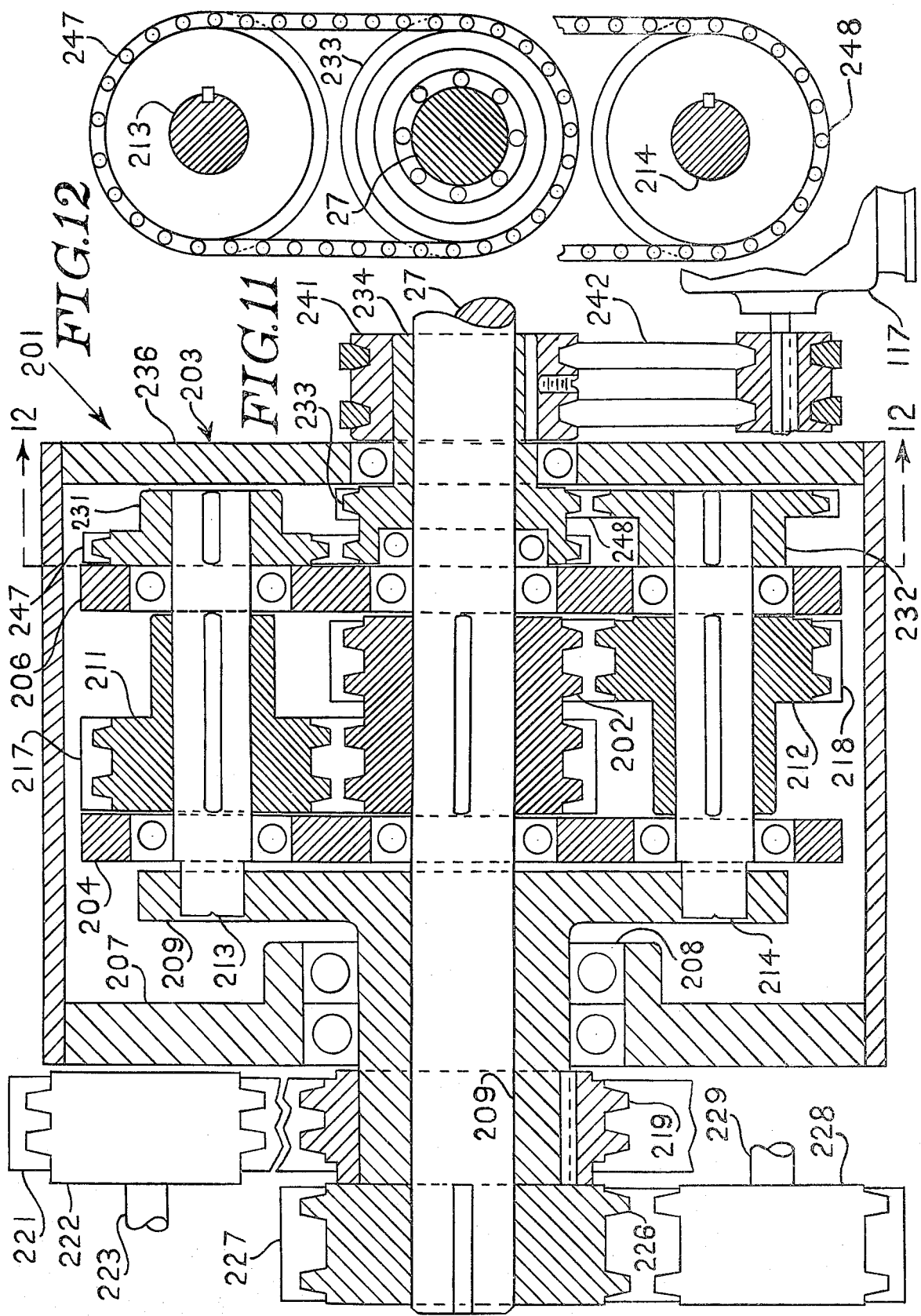

ELECTRIC PROPULSION SYSTEM FOR WHEELED VEHICLES

BACKGROUND OF INVENTION

Innumerable different types of engines and drive systems have been developed and the internal combustion engine has been very widely employed for all types of vehicle propulsion. Various limitations and disadvantages of internal combustion engines have been widely publicized in recent years, such as the rapid consumption of irreplaceable fossil fuel and the exhaust into the atmosphere of pollutants which are deleterious to plant and human life.

Many attempts have been made to improve and to replace internal combustion engines for wheeled vehicles, and in this category are to be found steam engines and electric propulsion systems. Although the concept of an electrically driven vehicle is intriguing and has attracted widespread interest, the storage of sufficient electrical power to propel a vehicle such as an automobile at a substantial speed over a long distance, remains a serious problem. Commercially available electrical propulsion systems for wheeled vehicles normally provide only a relatively low speed drive, and in addition, require frequent recharging of the numerous batteries necessarily associated therewith.

The present invention provides an electric propulsion system for wheeled vehicles, such as automobiles and the like, which is capable of relatively long range operation at substantial speeds while being particularly economical of fuel consumption and at the same time being ecologically acceptable.

SUMMARY OF INVENTION

The propulsion system of the present invention incorporates at least one prime mover operated by electrical energy to rotate a shaft, and includes means for generating electrical energy from shaft rotation during predetermined conditions. Preferably, the present invention incorporates a separate electric motor and an electric generator or alternator, and may incorporate a multiplicity of electric motors and generators. The present invention is particularly directed to the conservation of energy in vehicle propulsion, and the electrical system of the present invention provides for generating electrical power under all possibly advantageous circumstances, wherein the momentum of the vehicle may be converted into electrical power. The drive motor supplies power to the wheels of the vehicle, as required for controllable drive thereof. In other circumstances wherein no drive power is required, the generator or alternator of the invention is driven by the wheels to generate electrical energy which is stored for subsequent use by the motor. The electrical circuitry interconnects the motor and generator with the battery in such a manner as to utilize even the slightest possible transfer of energy from a drive shaft for generating electricity.

The present invention includes a variable ratio power coupler, which connects the motor of the system to a drive shaft, so as to preclude the necessity of a separate clutch machanism. The variable ratio power coupler of this invention has a plurality of satellite sprockets mounted for rotation between satellite carriers that are also mounted for rotation and are driven by the electric motor or motors of the system. The satellite sprockets have satellite sprockets or gears on the axles thereof, which engage a pilot sprocket or gear having control means for adjusting the speed of rotation thereof. A sun sprocket keyed on the drive shaft of the system is chain connected to the satellite sprockets and is rotated thereby at a rate determined by the controllable rate of rotation of the pilot sprocket or gear.

The present invention preferably provides a number, such as three different speed ranges within which the speed may be continuously varied by the power coupler. In each speed range the motor or motors preferably operate at a fixed rate of rotation and control of the rate of rotation of the drive shaft is accomplished by the variable ratio power coupler. It is possible to operate the propulsion system of the present invention by controls which appear to an operator to be the same as or very similar to those of a conventional automobile, for example. The selection of speed ranges is preferably accomplished by push buttons. However, the variation of speed within a range may be accomplished by "an accelerator pedal" having operating characteristics that appear to be the same as the conventional gas pedal of an automobile, even though this pedal is, in fact, electrical controlling the system of the present invention.

DESCRIPTION OF FIGURES

The present invention is illustrated as to particular preferred embodiments thereof in the accompanying drawings, wherein:

FIG. 10 is an electrical diagram of the generator circuitry of the present invention;

FIG. 11 is a central sectional view of an alternative power coupling in accordance with the present invention; and FIG. 12 is a sectional view taken in the plane 12—12 of FIG. 11.

DESCRIPTION OF PREFERRED EMBODIMENT

Figure 1:
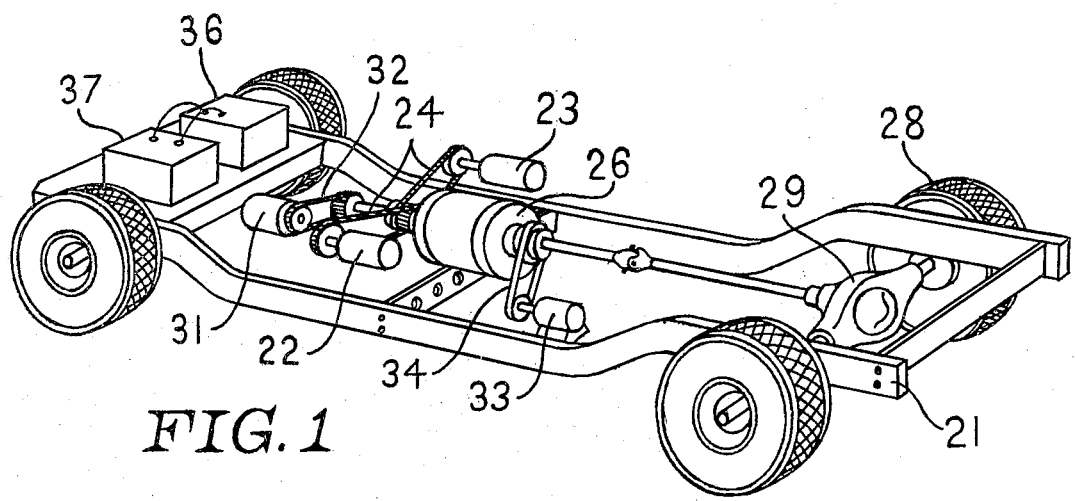
FIG. 1 is a pictorial representation of a system in accordance with the present invention mounted on an automobile frame.

In FIG. 1 of the drawings there is illustrated an embodiment of the present invention mounted upon an automobile frame 21. The illustrated system includes a pair of electrical motors 22 and 23 connected by a chain drive 24 to a power coupling unit 26 which is connected to a drive shaft 27 of the vehicle. The drive shaft 27 may be conventionally connected to rear wheels 28 of the vehicle by a differential 29. One or more generators or alternators 31 are connected to the drive shaft, as by means of a chain drive 32. Speed control means 33 is connected to the power coupling unit 26 by a pulley 34. There is additionally provided an electrical control system schematically illustrated at 36, and a battery 37, with these latter two elements being appropriately electrically connected to other elements of the system. The speed control means 33 may be controlled by an operator of the system through an accelerator pedal 38, as indicated in FIG. 3, and various controls and meters are employed with this system, as indicated in FIG. 2.

Figure 2:
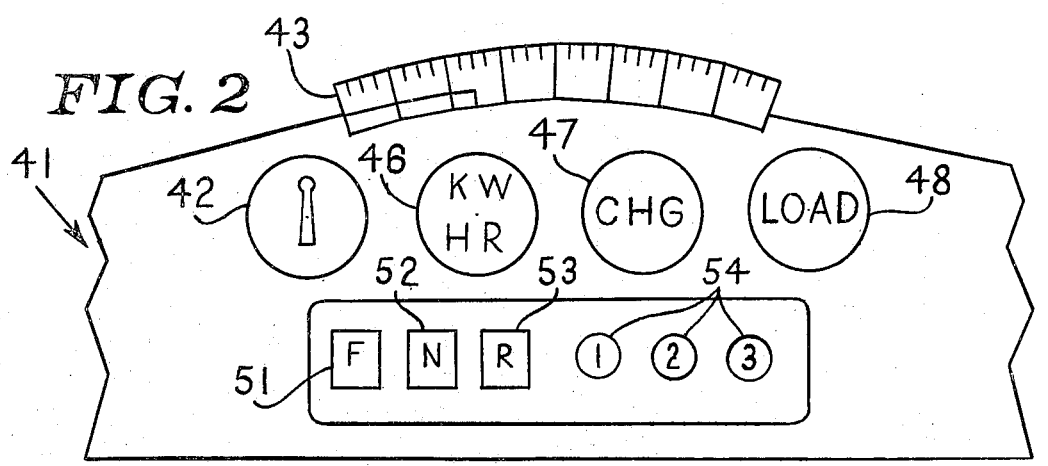
FIG. 2 is an illustration of a vehicle control panel or dashboard incorporating meters and controls that may be employed with the present invention.
Figure 3:
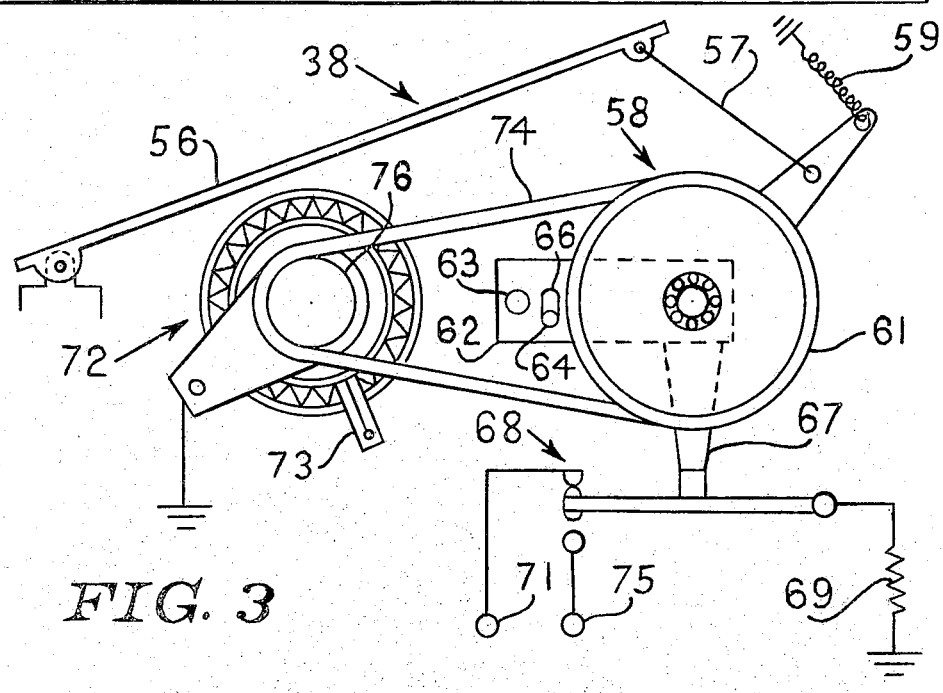
FIG. 3 is a side elevational view of an accelerator pedal and control means that may be employed with the present invention.
Figure 4:
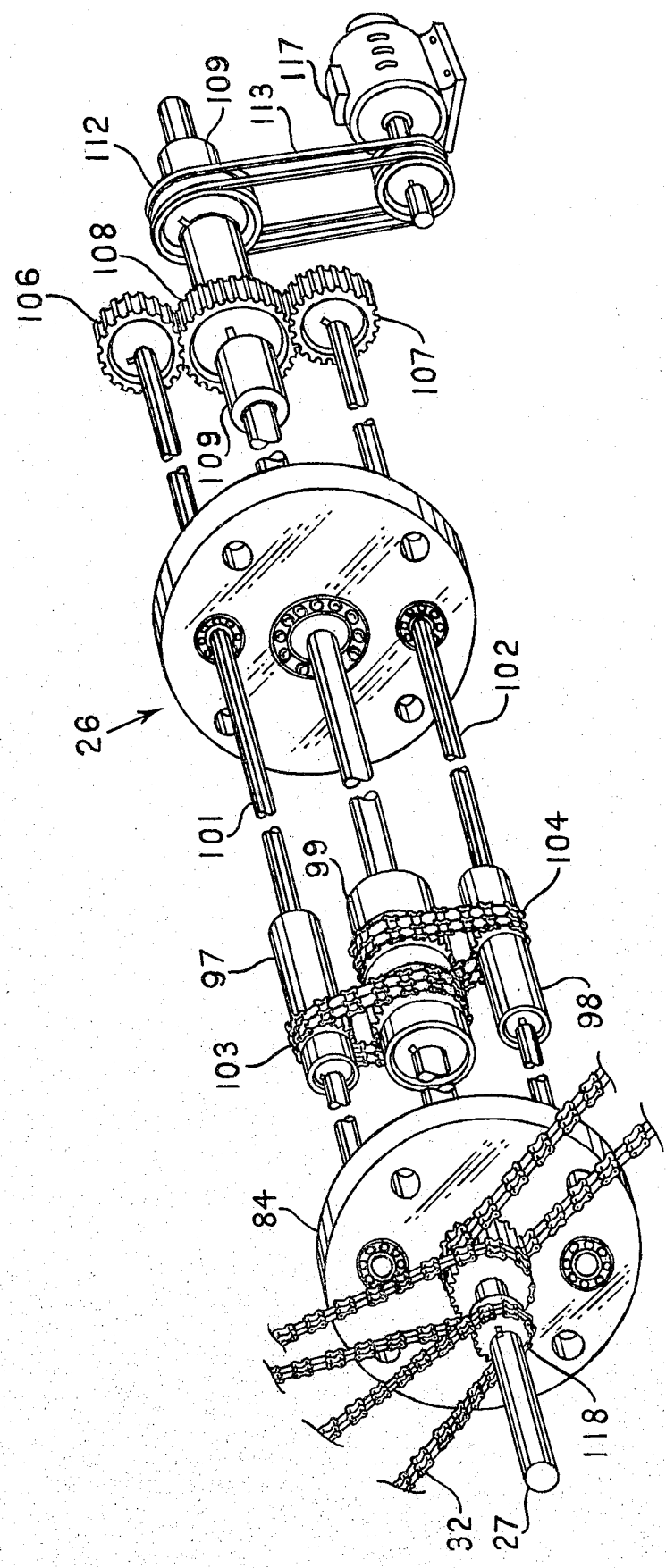
FIG. 4 is an exploded perspective view of a power coupling unit in accordance with the present invention.
Figure 5:
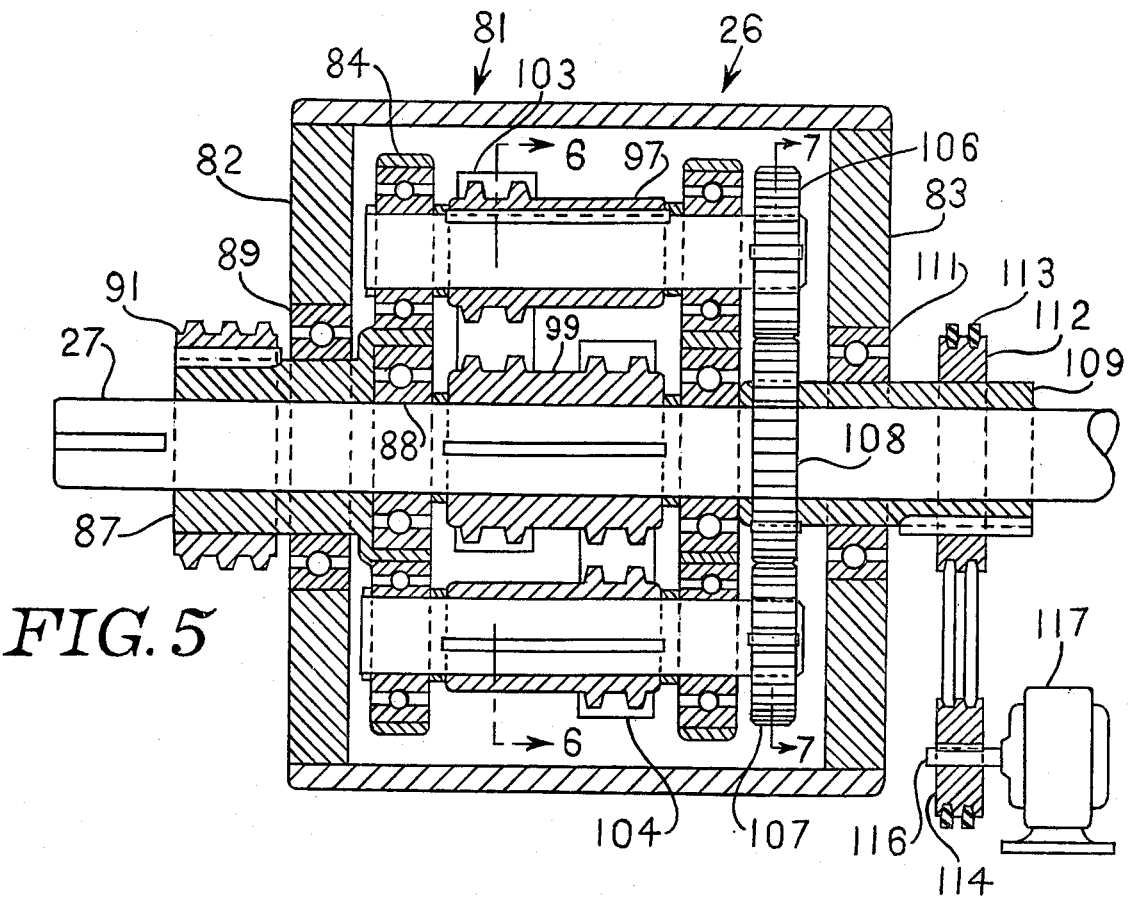
FIG. 5 is a central, longitudinal transverse sectional view of the power coupling unit of FIG. 4.
Figure 6:
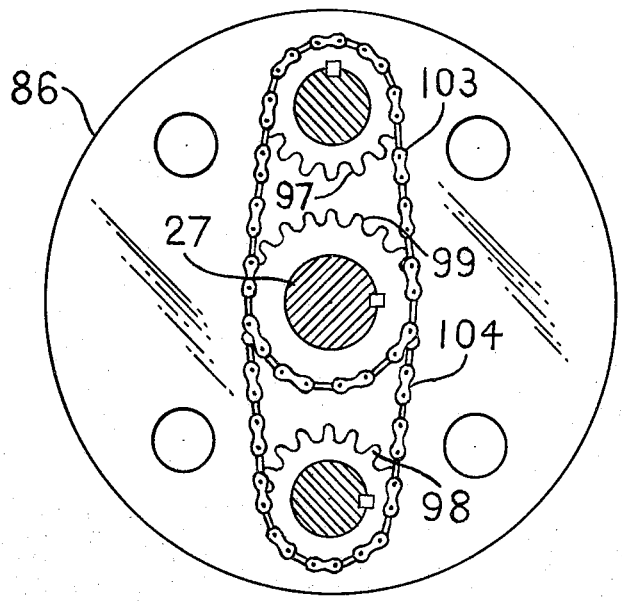
FIG. 6 is a transverse sectional view taken in the plane 6—6 of FIG. 5.
Figure 7:
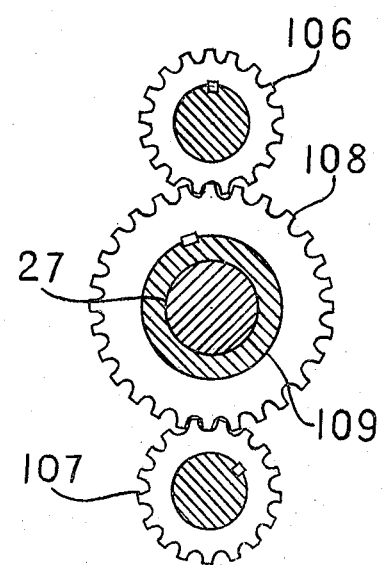
FIG. 7 is a transverse sectional view taken in the plane 7—7 of FIG. 5.

Referring now to FIG. 2, there will be seen to be illustrated a portion of a control panel or dashboard 41 of a vehicle, which may include a key switch 42 for energizing and de-energizing the system of the present invention. Either an analog or digital speedometer 43 is provided, together with a number of meters which may be provided to indicate the condition of the system such as, for example, a kilowatt hour meter 46, a charge meter 47 and a load meter 48.

The instrument and control panel 41 also includes means for setting the propulsion system for operation in forward, neutral and reverse, and control for same is illustrated by the push buttons 51, 52 and 53, respectively. In order to maintain the motor speed constant in the system hereof, with a minimum of mechanical complexity, it is preferable that the system be operated in one of a plurality of selected speed ranges. Control of these speed ranges may be accomplished by push buttons 54 in the manner further described below. While it is not required that the instrument panel of the present invention include gauges or meters, it is advantageous to incorporate indicators of the system condition, in order that an operator of the system may minimize the utilization of energy for vehicle propulsion, and also be advised at all times of the condition of the system.

Application of the present invention to a motor vehicle, for example, may be simplified so far as an operator is concerned, by employing conventional control means. To this end, the present invention is adapted to employ an accelerator pedal 38 which appears to an operator to operate in the same manner as the gas pedal of an internal combustion-driven vehicle. The accelerator pedal mechanism 38, as shown in FIG. 3, includes a pivotally mounted pedal 56 connected by a pivotal link 57 to switching means 58, which is spring loaded, as indicated at 59, to maintain the pedal and switching means in the illustrated position.

The switching means 58 includes a pulley wheel 61 mounted for rotation upon an arm 62 that is, in turn, pivotally mounted by a pivot pin 63 upon a fixed element such as a housing or frame, and the degree of pivoting of this arm 62 is limited by a fixed pin 64 extending through a small vertical slot 66 in the arm. It will thus be seen that initial depression of the pedal 56 will pivot the arm 62 a limited amount, and then will subsequently rotate the pulley wheel 61. An extension 67 of the pivot arm 62 comprising an actuator of a microswitch 68, which is shown to have the fixed side of the switch contacts connected to electrical ground through a resistor 69. A switch arm 70 is movable by the actuator 67 between contacts connected to terminals 71 and 75. The switch 68 will be noted to normally ground terminal 71, and upon depression of the pedal 76 to unground this terminal and ground terminal 75.

The accelerator pedal mechanism 38 also includes a rheostat 72 connected between electrical ground and a speed control terminal 73. The rheostat 72 is operated by the accelerator pedal 56 as by a belt 74 connected about the pulley wheel 61 and about a pulley wheel 76 on the rheostat, so that depression of the accelerator pedal first opens the microswitch 68 and then rotates the pulley wheel 61 to rotate the rheostat arm for reducing the resistance between the speed control terminal and electrical ground. The electrical terminals of the accelerator pedal mechanism form a part of the electrical control system of the present invention, which is described below in connection with FIGS. 8-10. The accelerator pedal mechanism is adapted to operate an electrical motor associated with the power coupling unit 26 of the invention, and there follows a description of one embodiment of this power coupling unit, while another embodiment thereof is illustrated in FIGS. 11 and 12.

Referring now to FIGS. 4 through 7, there will be seen to be illustrated a continuously variable speed power coupling unit 26 mounted upon the drive shaft 27 and employing both chains and gears. The coupling unit 26 includes a housing 81 having end walls 82 and 83 through which extends the drive shaft 27. Within the housing 81 there are provided a pair of spaced satellite carriers 84 and 86, with the carrier 84 including a hub 87 rotatably mounted upon the drive shaft 27 by an internal bearing 88 and disposed within an external bearing 89 mounted in housing end wall 82. This hub 87 extends exteriorly of the end wall 82 in rotatable relation to the drive shaft and carries a sprocket 91 about which there is disposed one or more drive chains 24 connected to sprockets on the shafts of motors 22 and 23. With this arrangement, the satellite carrier 84 will be seen to be rotated by the motors 22 and 23.

Within the housing 81 the satellite carriers 84 and 86 are pinned together by fixed pins 96 to lock the carriers in fixed spaced relationship and insure rotation of the carriers together about the drive shaft. Between the carriers there are disposed a pair of satellite sprockets 97 and 98, which are connected to a sun sprocket 99 that is keyed to the drive shaft. The satellite sprockets 97 and 98 are keyed to axles 101 and 102, respectively, which are rotatably mounted between the carrier plates 84 and 86 by suitable bearings, as shown. The satellite sprocket 97 is connected to the sun sprocket 98 by a drive chain 103, and the satellite sprocket 98 is connected to the sun sprocket by drive chain 104. It will be seen that rotation of the satellite carriers in a clcokwise direction by motor drive will cause the satellite sprockets 97 and 98 to rotate in a counterclockwise direction by virtue of the chain connections thereof to the sun sprocket, as long as the drive shaft 27 is immobile.

The satellite sprocket axles 101 and 102 extend through the carrier 86 into fixed engagement with speed control means which may include satellite gears 106 and 107, respectively. Reference is made to alternative speed control means illustrated in FIGS. 11 and 12 and described below. The satellite gears engage a central pilot gear 108 mounted upon a sleeve 109 about the drive shaft and extending through the housing end plate 83 within a bearing 111. The sleeve 109 will thus be seen to be mounted for rotation upon the drive shaft, and exteriorly of the housing 81 there is provided a pulley wheel 112 keyed to the sleeve 109 with one or more belts 113 extending about the pulley wheel 112 and about a pulley wheel 114 upon a motor shaft 116. This motor shaft 116 may, for example, comprise the shaft of a speed control motor 117.

As the satellite carriers 84 and 86 rotate within the housing 81 by motor drive, and with the drive shaft 27 immobile, the satellite gears 106 and 107 will be seen to rotate about the pilot gear 108 and, in turn, rotate this pilot gear. In the illustrated example wherein the satellite carriers are rotated in a clockwise direction, the satellite gears also rotate in a clockwise direction, so that the pilot gear is rotated in a counterclockwise direction, as long as the mounting sleeve 109 thereof is free to rotate.

Before proceeding further with a description of operation of the unit 26, it is important to note that the number of teeth on the sun sprocket 99 must be at least one more than the number of teeth on each of the satellite sprockets 97 and 98. The reason for this limitation is the necessity of causing the satellite sprockets to rotate backwards upon their respective pins, i.e., in a counterclockwise direction, so that pilot gear 108 is capable of regulating the full rotation of the satellite sprockets on their axles or pins, while the satellite sprockets are being driven in a clockwise direction. The satellite gears and pilot gears may have the same number of teeth, inasmuch as this is not determinative of any direction of rotation.

In addition to the motor connection to the power coupler 26, as described above, the generator 31 is connected by the drive chain 32 to a sprocket wheel 118 mounted on the drive shaft 27. Thus it will be seen that any rotation of the drive shaft will rotate the armature of the generator, and electrical circuitry is provided to energize the field coils of the generator under predetermined conditions for generating electricity, that, in turn, may be employed to subsequently drive the motors so as to minimize the overall expenditure of energy. This is further described below in connection with the electrical circuitry of the present invention.

Operation of the power coupler may be best understood by considering an example wherein the sun sprocket 99 is provided with 13 teeth and each of the satellite sprockets is provided with 12 teeth. With this difference of one tooth between the satellite sprockets and sun sprocket, the satellite sprocket will rotate backwards upon their respective pins freely, one time for each twelve turns of forward rotation of the satellite carrier. With the drive motors rotating the satellite carriers at 1800 r.p.m., the satellite sprockets will be seen to rotate backwards or counterclockwise in FIG. 6, for example, at a rate of 150 r.p.m. Thus the idling speed of the coupler would be 150 r.p.m. and no torque would be transmitted to the drive shaft, as long as the pilot gear is free to rotate. In this condition, the satellite gears 106 and 107 will be seen to also rotate in a counterclockwise direction at 150 r.p.m., inasmuch as they are keyed to the same axles as the satellite sprockets. This will cause the pilot gear to freely rotate in a clockwise direction at the same rate, assuming that the satellite gears and pilot gear have the same number of teeth. This condition then exists during idling of the power coupler. Application of a driving force to the pilot gear 108 by the electric motor 117 will increase the rotation of the pilot gear, and thus speed up the satellite gears which are pinned to the same axles as the satellite sprockets. Consequently, the rotation of the satellite sprockets about their axles will be increased so as to apply a force to the sun sprocket 99, and consequently drive the sun sprocket and attached drive shaft in a clockwise direction. As the pilot gear is further speeded up, the rate at which the sun sprocket is rotated is increased until the pilot gear is running at full speed and the satellite sprockets then drive the sun sprocket at the same rate of rotation as the sprocket carriers, i.e., 1800 r.p.m. in the foregoing example. Thus it will be seen that the power coupling unit provides for continuously varying the speed of the drive shaft merely by actuating the electric motor 117 to progressively speed up the pilot gear 108. As the pilot gear is speeded up by the motor 117, the satellite gears are made to increase speed so as to increase the rotation of the satellite sprockets. This then transmits a driving force through the chains 103 and 104 to the sun sprocket 99 that is keyed to the drive shaft. It will thus be seen that control over the transmission of power to the drive shaft is provided by the motor 117, with the speed of rotation of the drive shaft then being continuously variable from zero to the operating speed of the motors 22 and 23. These motors are adapted to be operated at one of a number of predetermined speeds, which are selected by the range buttons 54 in FIG. 2 and the drive shaft is then controllably rotated at a speed within one of the speed ranges.

Figure 8:
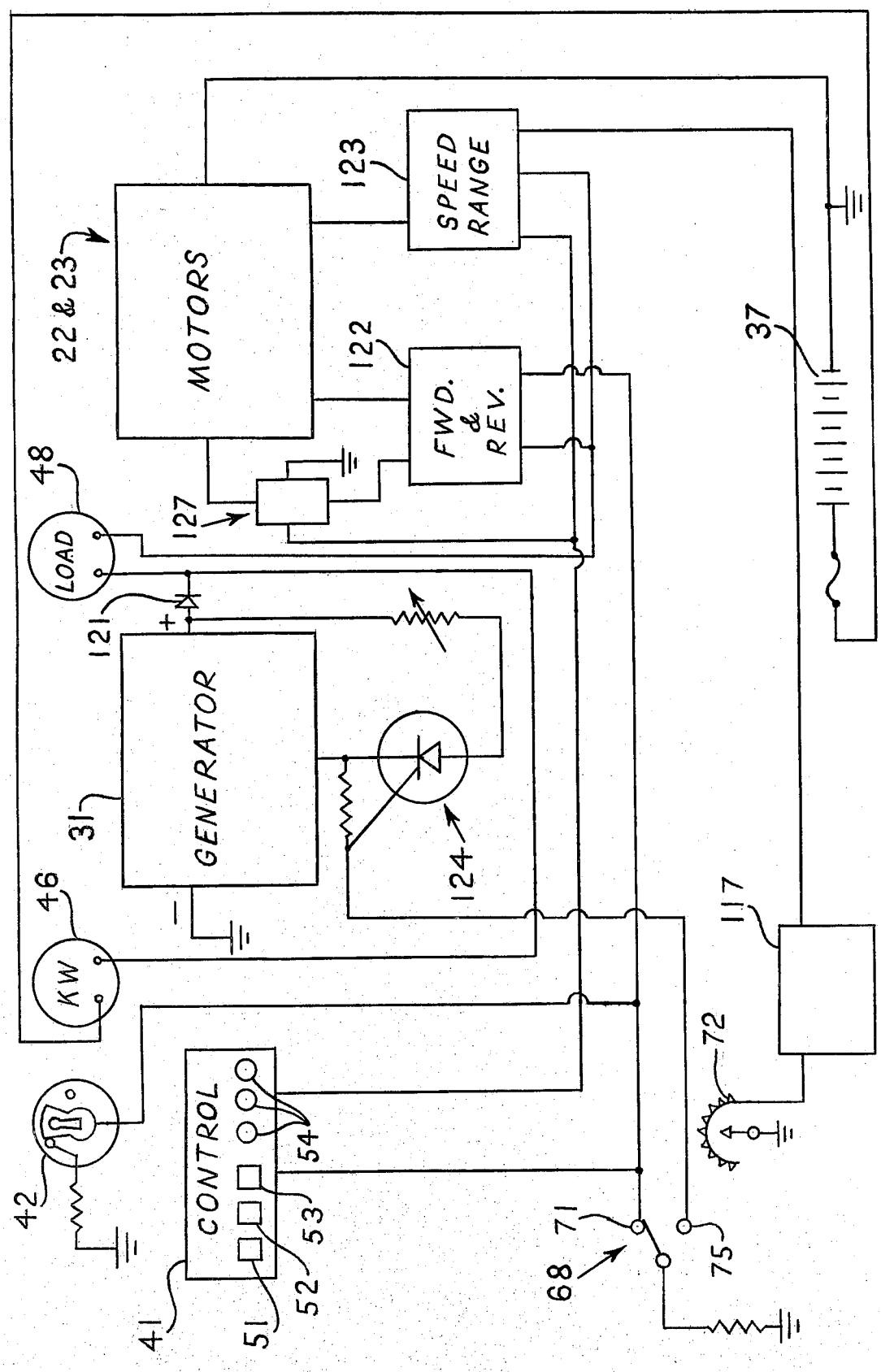
FIG. 8 is a block diagram of electrical circuitry of the present invention.

Reference is now made to FIG. 8 of the drawings illustrating in block form the electrical circuitry of the present invention. In general, the circuit includes a battery 37 connected through the kilowatt hour meter 46 and load meter 48 across the motors 22 and 23 for energizing the motors.

The generator 31 is coupled by a diode 121 to the foregoing circuit. The forward and reverse buttons 51 and 53 are connected to terminal 71 of the switch 68, to key switch 42, and to a forward and reverse circuit 122 for controlling the motors and this circuit 122 is, in turn, connected between the load meter 48 and the motors 22 and 23. The range buttons 54 are connected through a speed range circuit 123 to the motors and the speed control motor 117 is connected to this speed range circuit 123 and through the rheostat 72 to ground. A silicon controlled rectifier (SCR) 124 is connected to control excitation of the generator 31 and the gate of SCR 124 is connected to terminal 75 of switch 68 on the accelerator pedal. A solenoid-operated relay 127 is controlled by current to the motors for opening and closing contacts that switch inputs to the speed range circuit 123 to provide an overtake function. The purpose of this relay is to automatically change from speed range #2 to speed range #3 for passing slow moving vehicles, for example, and automatically returns to #2 speed range by slight decelerating after passing the slow moving vehicle.

Figure 9:
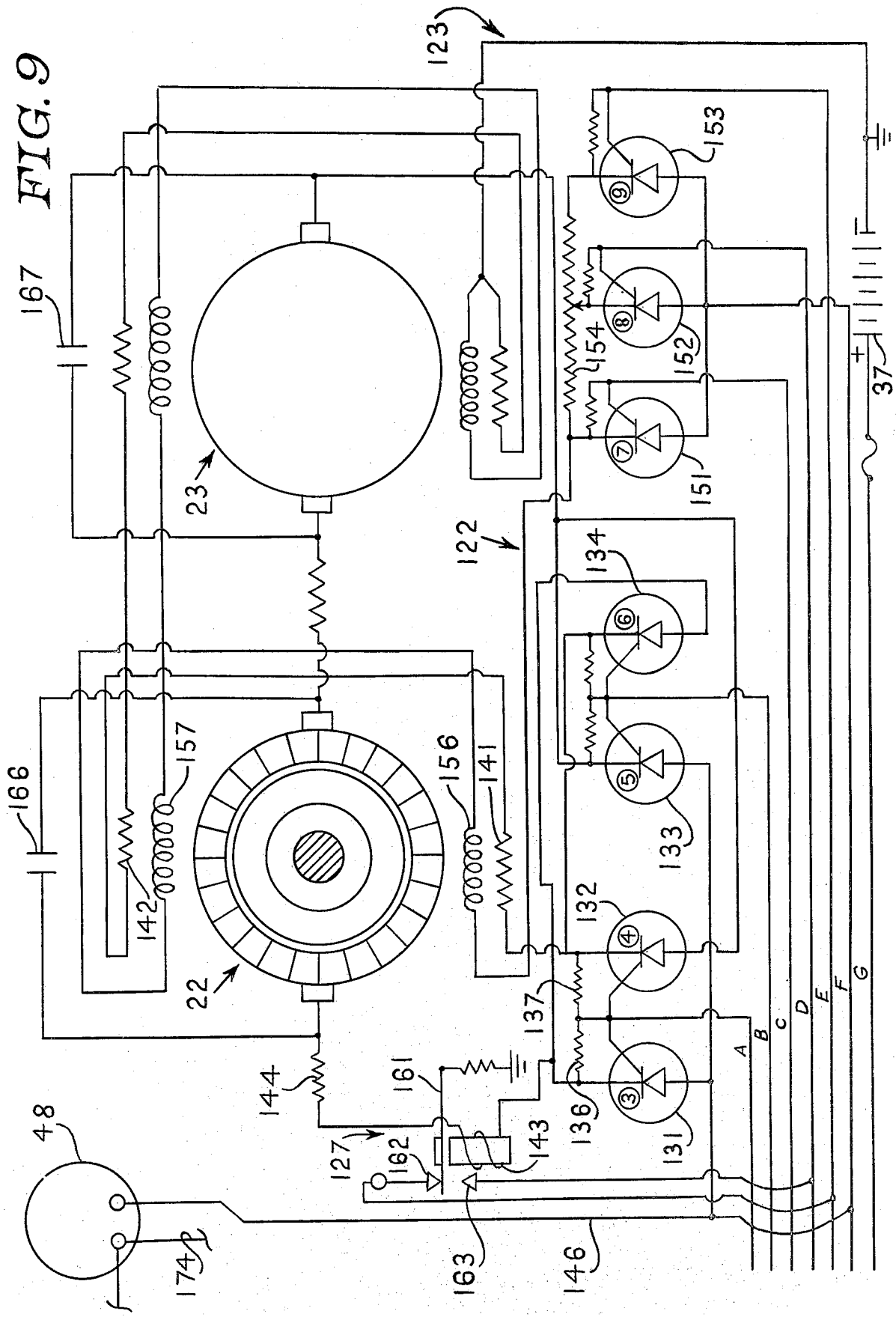
FIG. 9 is a circuit diagram of the electrical motor circuitry of the present invention.

Considering now the circuitry of the present invention in somewhat greater detail, reference is first made to FIG. 9 of the drawings illustrating connections of the two motors 22 and 23. These motors are preferably compound-wound motors with the field windings connected in series. The armatures are also connected in series together with the series field windings. Both motors are connected in series in order to be able to operate at higher voltages.

The forward and reverse circuit 122 is shown to include four silicon controlled rectifiers-SCR's 131, 132, 133 and 134. These SCRs are similarly connected in pairs and the first pair 131 and 132 has the cathode of the SCRs connected together by resistors 136 and 137, with the gates of the SCRs connected together at the junction of these two resistors, and also connected by a conductor A to terminal 72 of the microswitch 68, key switch 42, and to the control panel 41. The cathode of SCR 132 is connected in series with the two shunt field windings 141 and 142 of motor 22 which, in turn, are connected in series with the shunt field windings of motor 23 and thence to the negative side of the battery 37. The cathode of SCR 131 is connected through the coil 143 of solenoid 127 and a resistor 144 to a first commutator contact of the motor 22. The cathode of SCR 131 is also connected to the anode of SCR 134. The anode of SCR 131 is connected to the anode of SCR 133 and also to a conductor 146 that extends from one side of the load meter 48 to a conductor F that joins the anodes of SCRs in the speed range circuit 123 to the speed control motor 117. The second pair of SCRs 133 and 134 are connected with the anode of SCR 134 joined to the cathode of SCR 131, and the cathode of SCR 134 joined to the cathode of SCR 132. The cathode of SCR 133 is connected to a first commutator contact of motor 23. The gate electrodes of SCRs 133 and 134 are connected to line B which extends to the first speed control button of the control panel 41.

The speed range circuit 123 includes three SCRs 151, 152 and 153, which have the anodes thereof joined together and connected to line F, as noted above. The cathodes of SCRs 151 and 153 are connected to opposite ends of a resistor 154, and the cathode of SCR 152 is connected to a variable point upon this resistor. The cathode of SCR 151 is also connected to one end of a first shunt winding 156 of motor 22, that in turn, is connected in series with a second shunt winding 157 thereof which is connected through a series connection of the shunt windings of motor 23 to the negative side of the battery 37. The gate electrodes of the SCRs of the speed range circuit 123 are each connected through separate resistors to the respective cathodes of the SCRs and the gates of the SCRs 151, 152 and 153 are connected to lines C, D and E, respectively, which are connected to the power range buttons 3, 2 and 1 of the control panel 41.

Considering further the circuitry illustrated in FIG. 9, it is noted that the solenoid 127 includes a switch arm 161 having the fixed end thereof grounded through a resistor and the other end movable between switch contacts 162 and 163. Contact 162 is connected to line E, and the contact 163 is connected to line D. Switch arm 162 normally engages contact 162 to thus electrically ground line E through a resistor. However, upon a passage of a sufficient current through the coil 143 of this relay, the switch arm 161 is drawn or pivoted downwardly to electrically ground contact 163 connected to line D. It will be seen that passage of sufficient motor current through solenoid coil 143 will cause the speed range control to switch from range 2 to range 3, and thus operate in the manner of an "overtake" function in an automobile. It is also noted that a capacitor 166 is connected between the two commutator contacts of the motor 22 and a capacitor 167 is connected between the commutator contacts of motor 23. The second commutator contact of motor 22 is series coupled to the first commutator contact of motor 23. The two motors are connected in series for purposes of operating the motors at a higher voltage.

Referring now to FIG. 10, it is noted that the conductors A to G are similarly identified in FIGS. 9 and 10, in order to be able to follow the connection of elements between these two figures. The generator 31 is shown to have field windings 171 and 172 thereof connected in series between electrical ground and the cathode of the SCR 124, which is provided to control self excitation of the generator 31. The anode of SCR 124 is connected through a variable resistor 126 to the positive output terminal or contact of the generator so that conduction of SCR 124 will energize the field coils of the generator above some speed of say fifteen miles per hour whereat the generator will generate a small output voltage of say seven to nine volts without excitation. The gate of SCR 124 is resistively coupled to the cathode and is connected to terminal 75 of the accelerator pedal switch 68. Thus at any time the accelerator pedal is depressed to unground terminal 71 and drive the motors the generator will not be excited because terminal 75 grounds the gate of SCR 124 to prevent conduction to the generator field windings. At any time the operator allows the accelerator pedal to pivot upwardly, the switch terminal 75 is ungrounded to cause SCR 124 to conduct if the generator is turning fast enough so that the generator is excited to apply an output to the power line 174 between the meters 46 and 48. The motors will not be energized under this condition inasmuch as switch terminal 71 is grounded. The charge meter 47 will indicate the charging current and the kilowatt hour meter will be driven in the opposite direction during charging so that the operator may, at all times, be apprized not only of the rate of battery charging or discharging, but also of the charge on the battery. One side of the kilowatt hour meter 46 is connected to the positive side of the battery 37 by conductor G, and the other side of the kilowatt hour meter is connected by line 174 to the load meter 48. The charge meter 47 is shown to be connected in series with a variable resistor 180 between a terminal of the kilowatt hour meter and a terminal of the charge meter. The connection of the control panel buttons has previously been described with respect to FIG. 9, except that the forward push button 51 is additionally connected to terminal 71 of the microswitch 68 which is operated by the accelerator pedal to ground this terminal through a resistor. The speed control motor 117 is shown in FIG. 10 to be connected with the windings thereof in series with the armature between line F and the rheostat 72.

Operation of the present invention follows directly from the above-described structure and circuitry. However, there are at least certain important points that might not be apparent, and thus there follows a resume of operation with emphasis upon these points. The battery 37 is connected across the electric motors 22 and 23 by a circuit including the kilowatt hour meter 46, the load meter 48 and the forward and reverse circuit 122, as well as the speed range 123. The gates of the SCRs 131-134 are connected to the key switch 42 which normally grounds these gates to prevent the SCRs from conducting. Consequently, the system is inoperative until a key is inserted in the switch 42 and turned to disconnect the gate of SCRs from ground. The SCRs then conduct to energize the motors and, with the system in the first power range, the motors are energized to rotate at a first predetermined constant speed, such as 1800 r.p.m. This speed selection is accomplished at the control panel by depressing one of the buttons 1, 2 or 3, which ungrounds the one gate of a SCR of the speed range circuit 123 while grounding the gates of the other two SCRs. These push buttons are interlocked so that only one SCR gate is ungrounded at a time. The forward and reverse buttons operate to selectively unground lines A and B leading to the gates of pairs of SCRs in the circuit 122, and the neutral button operates to ground both of these lines so as to disable this circuit and prevent energization of the motors. With the forward push button 51 depressed, the motors will rotate the satellite carriers of the power coupling unit in a forward direction, and with the pilot gear 108 free to rotate, the satellite sprockets 97 and 98 will rotate in a reverse direction, i.e., counterclockwise, as they spin about the stationary sun sprocket 99. Upon release of the vehicle brakes and depression of the accelerator pedal 56, the microswtich 68 will be opened to remove the second source of ground connected by line A at terminal 71 to the SCRs 131 and 132 of the forward and reverse circuit 122. Additional depression of the accelerator pedal varies the resistance in the armature circuit of the speed control motor 117 to consequently apply a force to the hub 109 of the power coupling unit, and this, in turn, speeds up the rotation of the pilot gear 108. As the pilot gear is speeded up, the engaging satellite gears 106 and 107 are speeded up, so that the satellite sprockets keyed to the same shafts or axles as the satellite gears, will exert a force upon the sun sprocket through the belts 103 and 104. This causes the sun sprocket 99 to rotate and this rotates the drive shaft 27 keyed to the sun sprocket. The vehicle will then be driven forwardly, and the rate of rotation of the drive shaft may be increased up to substantially the r.p.m. of the motors by continued depression of the accelerator pedal. At any time pressure on the accelerator pedal is released so that the pedal starts to pivot upwardly, the microswitch 68 contact will be raised to ground terminal 71 and disconnect the battery from the motors. Any subsequent depression of the accelerator pedal will reconnect the battery to the motors.

As it requires two separate movements to be combined in order to cause the two drive chains to exert a pull upon the sun sprocket, it is necessary for the satellite sprockets to be rotated upon their pins by means of the speed control motor in order to produce a driving action. The foregoing produces a wedging action which prevents the drive chains from going into idling. Thus by applying a wedging action to the satellite sprockets so that the satellite carrier can pull the drive chains forward there is produced a continuous forward drive. This is the principle on which this coupler operates. First, the driving force is produced by the carrier as the result of the drive motors, and secondly, the wedging action is produced by the speed control motor and by combining these separate forces as above described, there is provided a continuous variable speed coupler.

The present invention operates to return electrical energy to the system under all circumstances where this is possible, in order to minimize the necessary expenditure of energy during propulsion of the vehicle. The generator 31 is directly connected to the drive shaft and is thus rotated as the drive shaft rotates. The SCR 124 operates to electrically energize the field windings of the generator so that electrical power is generated by the generator and is coupled through the diode 121 to the motor power line 174. With this arrangement, the generator output is available at all times to energize the motors and will, in fact, be effective whenever there is a transfer of energy from the wheels of the vehicle to the drive shaft. Naturally, the foregoing will not occur as long as the vehicle is being accelerated. However, as soon as the microswitch 68 grounds terminal 71 and ungrounds terminal 75, the battery is disconnected from the motors and the generator is excited so that the output is employed to charge the battery. This generator output is also coupled across the battery through the charge meter 47 and kilowatt hour meter 46, so that excess electrical energy generated by the generator during periods of momentum transfer to the drive shaft is fully utilized to recharge the battery to the extent possible. Although it is recognized that operation of the system of the present invention requires the expenditure of energy, it is possible with the present system to minimize this expenditure of energy, so that electrical charge upon the battery is maintained over a prolonged period. This is highly advantageous in minimizing the amount of recharging of the battery that is required for operation of the vehicle. It is, of course, also to be realized that the term "battery" herein may encompass a plurality of individual batteries themselves. However, here again, the present invention is particularly advantageous in limiting the necessary electrical storage capacity of the system for relatively high speed operation of a vehicle over prolonged periods.

The power coupling system of the present invention has been described above with respect to operation in a forward direction. However, it will, of course, be appreciated that the power coupler is equally adapted to operate in the reverse direction. Furthermore, the power coupler is not limited to operation at any particular speed, and, in fact, the system hereof, as illustrated, provides for operation of the drive motors at any one of three different speeds. With the power coupler and system hereof, the vehicle may then be driven at any predetermined speed falling within any of the speed ranges, and, of course, the motors are driven at constant predetermined speeds. With compound wound motors, full torque is available at each constant speed, and thus the system of the present invention provides a substantially constant torque output which again is highly advantageous in vehicle operation.

Many variations and modifications of the present invention are possible, both with regard to the mechanical and electrical details thereof, and in this respect, reference is made to FIG. 11 illustrating an alternative, and in many aspects advantageous embodiment of the power coupler of the present invention. The coupler 201 illustrated in FIGS. 11 and 12 employs only sprockets and chain drive and attains the desired "gear ratio" or torque ratio in a different manner than that of the coupler described above, although the basic concept of the alternative embodiments of the coupler herein are the same. The coupler illustrated in FIGS. 4 through 7 and described above, employs a combination of sprocket drive and gear control, however, it is possible to employ both a gear drive and gear control, or preferably to employ a complete sprocket and chain unit, such as illustrated in FIGS. 11 and 12. Referring now to FIGS. 11 and 12, there will be seen to be provided a coupler 201 having a sun sprocket 202 keyed to the drive shaft 27 within a housing 203. A pair of satellite carriers 204 and 206 are mounted for rotation on the shaft 27 by bearings on opposite sides of the sun sprocket 202 within the housing. The housing 203 includes a first end wall 207 having a central opening therethrough and mounting double bearings 208 disposed in bearing relation about a flanged hub 209 which rotatably fits upon the drive shaft 27. Within the housing 203, there are provided a pair of satellite sprockets 211 and 212 rotatably mounted upon pins or axles 213 and 214 respectively, which extend through bearings in the satellite carriers 204 and 206 and into a fixed engagement with the flanged hub 209. A first drive chain 217 couples the satellite sprocket 211 and sun sprocket 202, and a second drive chain 218 couples the satellite sprocket 212 and sun sprocket 202.

The flanged hub 209 will be seen to extend exteriorly of the housing 201 and a motor drive sprocket 219 is thereat keyed thereon with a motor drive chain 221 extending about this sprocket and about sprockets 222 on motor shafts 223. An additional sprocket wheel 226 is also keyed to the shaft 27 adjacent to motor drive sprocket 219 and a generator drive chain 227 extends about this sprocket and about a sprocket 228 fixed to the generator shaft 229.

It will be seen that operation of the motors to rotate the sprocket 219 will drive the flanged hub 209 so as to rotate the satellite carriers 204 and 206. This will cause the satellite sprockets 211 and 212 to be rotated about the sun sprocket 202, and with the satellite sprockets and sun sprockets having the same number of teeth, i.e. the pitch diameter, the satellite sprocket will merely move about the sun sprocket as the satellite carriers are rotated without rotating the axles or pins 213 and 214. This will apply substantially no driving force to the drive shaft 27.

Control over the application of a torque to the drive shaft 27 is provided in the present embodiment by a pair of control sprockets 231 and 232 keyed to the axles or pins 213 and 214, respectively, on the opposite side of the satellite carrier 206 from the satellite sprockets. A pilot sprocket 233 is rotatably mounted upon the drive shaft 27 between the control sprockets 231 and 232 with a cylindrical hub 234 thereof extending through an end wall 236 of the housing 203. Suitable bearings provide for rotation of this pilot sprocket 233 and attached hub 234. Exteriorly of the housing, there is provided a pulley wheel 241 which is locked to the hub 234. One or more belts 242 extend about the pulley wheel 241 and about a pulley wheel on the shaft of the control motor 117. It will be seen that the pulley wheel 241 and belts 242 correspond to similar elements 112 and 113 of FIG. 4 so that in the present embodiment of the coupler control over rotation of the pilot sprocket 233 is achieved from the control motor 117.

Operation of the coupler of FIGS. 11 and 12 described above is quite similar to the operation of the coupler previously described herein, however, it is noted that in this coupler, the sprockets of the coupler itself, i.e., the sun sprockets, satellite sprockets, control sprockets and pilot sprockets, are preferably all provided with the same number of teeth and pitch diameter. A torque ratio between the motor and drive shaft is attained by employing smaller sprockets 222 on the motor shafts 223 than the motor drive sprocket 219 on the drive shaft. Preferably, the ratio is 1½ to 1, i.e., the motor runs 1½ times as fast as the drive shaft is driven. With the motor energized and rotating, the satellite carriers of the coupler will be rotated by the flanged hub 209 so that the satellite sprockets 211 and 212 move about the sun sprocket and the chains 217 and 218 rotate backwards for a forward rotation of the satellite carriers. The speed control chains 247 and 248 will also rotate backwards as the speed control sprockets 231 and 232 are moved about the pilot sprocket 233. In order to apply a driving force to the drive shaft 227, the speed control motor 117 is operated to turn the hub 24 for rotating the pilot sprocket 233. This causes the control sprockets 231 and 232 to be rotated in a forward direction in the foregoing example, and inasmuch as these sprockets are keyed to the axles or pins 213 and 214, the satellite sprockets 211 and 212 also keyed thereto, are rotated. This then causes the drive chains 217 and 218 to rotate the sun sprocket 202 which is keyed to the drive shaft 27 and consequently, the drive shaft 27 is, in turn, forcibly rotated. Preferably, roller chains are employed in this coupler, and it will be seen that the speed control motor serves to continuously vary the speed of the drive shaft under control of the electrical system of the present invention as described above. The system will also be seen to operate in the same manner in reverse, and it is again noted that the generator is at all times coupled to the drive shaft so as to be available for the generation of electrical power as controlled by the electrical system hereof under conditions wherein this may be advantageously accomplished, in order to minimize the total electrical power usage from the battery.

It will be appreciated that the present invention may employ an alternator instead of a generator and also that a motor-generator may be employed in place of a separate motor and generator. In the latter instance, a one-way clutch may be incorporated in the coupler between the flanged hub and drive shaft to transfer energy to the motor generator for generating electricity.

The present invention has been described above with respect to particular preferred embodiments thereof, however, it will be apparent to those skilled in the art that numerous modifications and variations may be made within the scope of the present invention, and consequently, it is not intended to limit the present invention to the precise terms of description or details of illustration.

What is claimed is:

1. A propulsion system for a wheeled vehicle having an electric motor,
   a variable speed power coupling unit connecting said motor to a drive shaft,
   a generator connected to said shaft,
   a battery connected by switching means to said motor and generator, and
   control means including a movable accelerator pedal connected to a rheostat for controlling said variable speed power coupling unit and connected to operate a switch of said switching means having a first operating mode energizing said motor and a second operating mode energizing said generator, and means biasing said switch into said second mode, with said pedal overcoming said biasing means upon depression to place said switch in said first mode and raising of said pedal a predetermined amount from any depressed position returns said switch to said second mode for disconnecting said battery from said motor and energizing said generator under conditions wherein said drive shaft is not being driven by said motor for minimizing the power required to drive said vehicle.

2. The system of claim 1 further defined by
   speed range control means including switches operating silicon controlled rectifiers connected in circuit with a resistor and field windings of said motor for selectively inserting predetermined resistance in the field windings of said motor to establish controlled fixed rates of rotation of said motor.

3. The system of claim 1 further defined by
   forward and reverse control means including switches connected to control silicon controlled rectifiers in circuit with said battery and motor to selectively reverse the polarity of motor armature connections and thus the direction of rotation of said motor.

4. The system of claim 1 further defined by said variable speed power coupling unit having an electric control motor connected to control the rate of rotation of said speed control means establishing the coupling ratio of the unit for controllably varying the speed of drive shaft speed with constant motor speed.

5. The system of claim 4 further defined by a movable accelerator pedal operating a rheostat connected in circuit with said control motor for varying the rate of rotation of said control motor to control the coupling ratio of said coupling unit.

6. The system of claim 1 further defined by a silicon controlled rectifier connected in series between field windings of said generator and the output thereof, and having control means connected to ground through a switch operated by an accelerator pedal to energize said generator at all times that the battery is disconnected from said motor.

* * * * *